July 23, 1957 — A. M. ILG — 2,800,105
AMUSEMENT AND EXERCISING DEVICE FOR BIRDS
Filed Sept. 16, 1955
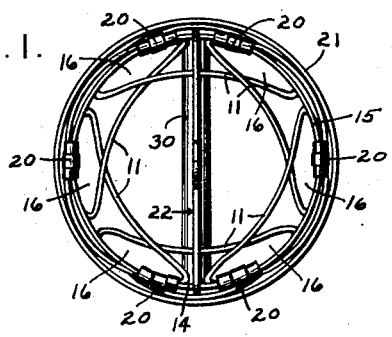
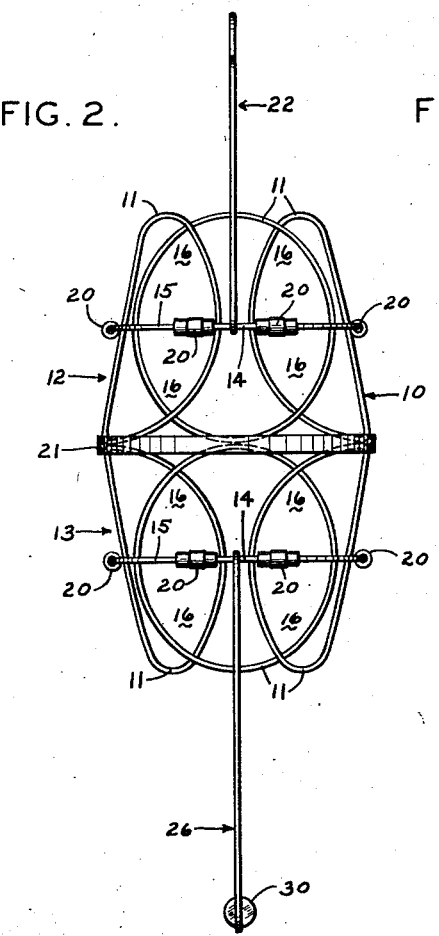
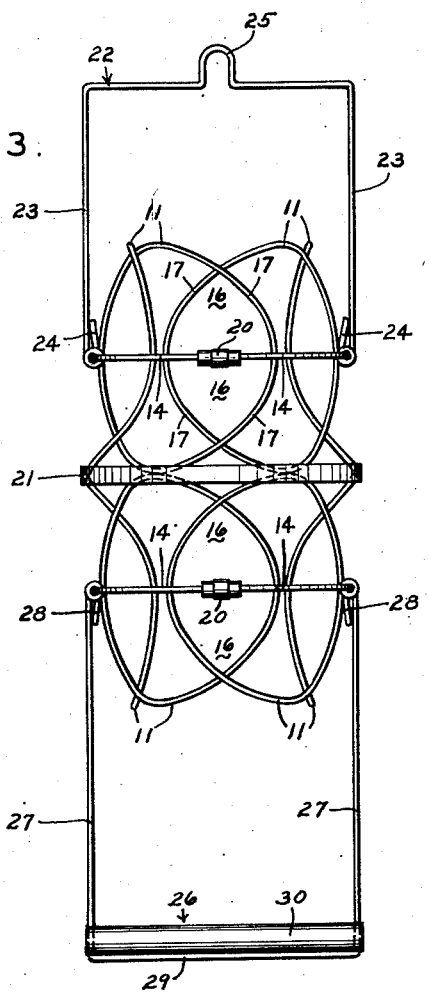
INVENTOR,
ADELINE M. ILG
BY Terry & Cohn
ATTORNEYS.

United States Patent Office 2,800,105
Patented July 23, 1957

2,800,105

AMUSEMENT AND EXERCISING DEVICE FOR BIRDS

Adeline M. Ilg, St. Louis, Mo.

Application September 16, 1955, Serial No. 534,694

9 Claims. (Cl. 119—29)

This invention relates to improvements in an amusement and exercising device for birds.

It is an important objective of the present improvements to realize a device that is attractive to birds and is adapted to afford a continuous source of amusement, the device being conveniently and easily mounted in or out of a bird cage by any suitable mounting means.

In addition to the foregoing stated objective, it is a further important object to realize a novel play device that presents a challenge to the resourcefulness and agility of the bird, and serves as an exerciser which is extremely beneficial to the health, spirit and general well being of the bird.

Another important object is realized in that the amusement and exercising device is simple and durable in construction, and economical to manufacture.

Still another important object is realized in that the novel device can be constructed of a mesh structure formed into a barrel-like tubular body, the mesh structure having openings of a size adapted to permit the passage of a bird therethrough. The bird is exercised and entertained by climbing on the tubular body and by moving in and out of the openings provided by the mesh structure.

Other important advantages are afforded by the provision of a perch carried by the tubular mesh structure directly below an open lower end thereof, the perch serving to induce and aid the bird in moving on and into the tubular structure.

Yet another important object is achieved by constructing the mesh structure of a plurality of overlapping rings arranged in rows in a manner such that the rings define openings for the bird for the purposes and advantages explained previously. It is further advantageous to provide a perch element diametrically around each row of overlapping rings so as to assist the bird in moving in and out of such openings.

Another important object is realized by the provision of a barrel-like, substantially cylindrical body that is normally disposed in vertical position, the body being open at the upper and lower ends to permit entrance into the interior of the body. The barrel-like body consists of a mesh structure having openings to permit the passage of a bird therethrough, and having perch elements partially defining such openings to assist the bird. The play device includes a perch carried by the barrel-like body directly below the open lower end adapted to entice the bird onto the barrel-like body, and means for mounting the body to a convenient support.

The foregoing and numerous other objects and advantages of the invention will more clearly appear from the following detailed description of a preferred embodiment, particularly when considered in connection with the accompanying drawing, in which:

Fig. 1 is a top plan view of the amusement and exercising device for birds;

Fig. 2 is a side elevational view of the device shown in Fig. 1, and

Fig. 3 is a side elevational view of the device shown in Fig. 2 taken at a 90° angle to Figure 2.

Referring now by characters of reference to the drawing it is seen that the amusement and exercising device for birds includes a vertical barrel-like tubular body, referred to generally at 10, comprised of a mesh material such as wire constructed in the manner and for the purpose described subsequently.

The barrel-like body 10 consists of a plurality of substantially circular rings 11 arranged in horizontal circular rows 12 and 13 indicated in Fig. 2. The circular row 12 of rings 11 is located immediately above the lower circular row 13. Each ring 11 in each of rows 12 and 13 overlaps the ring 11 located horizontally adjacent thereto, and extends not quite to the center of the overlapped ring 11. It is important to note that the overlapping rings 11 provide a sufficient space such as that designated by 14 in Figs. 2 and 3 so that the fragile legs of the bird will not be wedged in between the rings 11, and hence obviates any possible injury to the bird.

A perch element 15 extends horizontally around each circular row and is arranged diametrically around the overlapping rings 11, the perch element 15 and rings 11 of each of rows 12 and 13 defining openings 16 through which the bird is permitted to pass. As is best shown in Fig. 3 of the drawing, the ring portions 17 of overlapping rings 11 partially defining each of openings 16 are curvilinear in configuration, and conform substantially to the contour of the bird's body. The bird utilizing this novel amusement and exercising device will grasp the perch element 15 and move in and out of openings 16, the ring portions 17 massaging the bird's body with a simulated stroking action which the bird enjoys. Slidably retained on perch elements 15 immediately adjacent the openings 16 are a plurality of beads 20 which attract the bird and entice him on to the perch elements 15 for subsequent movement through openings 16. In reaching for the beads and by biting and tugging at them, the bird is subjected to stretching movements along its body from bill to toes, which affords extremely beneficial exercise.

The rings 11 of each horizontal circular row 12 and 13 are connected to the rings 11 of the other horizontal row, the mesh material formed by the rings 11 being shaped into a barrel-like tubular body that is open at the upper and lower ends. An intermediate retaining ring 21 encircles the tubular body 10 at the juncture of the horizontal circular rows 12 and 13 and assists in retaining the rings in overlapped position. The rings 11 of each of rows 12 and 13 are inclined inwardly toward the upper and lower ends to provide reduced entrances to the interior of the tubular body 10.

A hanger 22 is utilized to support the device inside or outside of a bird cage. The hanger 22 includes opposed arms 23 having hooked lower ends 24 adapted to engage and receive the perch element 15 at the space 14 located between overlapping rings 11 of upper circular row 12. It will be noted that upper circular row 12 of rings 11 includes a total of six rings which permit the hanger 22 to be connected in directly opposed, symmetrical relation as is shown in Figs. 2 and 3. A center projection 25 on hanger 22 adapts the device to be attached to a hook or to a cord for hanging the body 10 from a suitable support.

Located immediately below the lower open end of body 10 is a perch 26 fastened to perch element 15 at the space 14 between overlapping rings 11 of the lower circular row 13. The perch 26 includes a wire having opposed side arms 27 with end hooks 28 adapted to receive perch element 15, and includes a horizontal portion 29 for holding a wooden element 30.

It is thought that the use and functional advantages of the amusement and exercising device have become fully apparent from the foregoing detailed description, but for completeness of disclosure it will be noted that the bird will sit on perch 26 and will be enticed into the open lower end of body 10, and hence into the interior of such body. The bird will be attracted by the beads 20 and will move into and out of openings 16, the bird gripping perch elements 15. At times the bird will emerge from the open upper end of body 10 and climb on hanger 22.

The device affords a continuous source of amusement for the bird, and serves as an exerciser that is beneficial to the health, spirit and general well being of the bird.

Although the invention has been described by making detailed reference to a single preferred embodiment, such detail is to be understood in an instructive, rather than in a restricted sense, many variants being possible within the scope of the claims hereunto appended.

I claim as my invention:

1. An amusement and exercising device for birds comprising a mesh material formed into a vertical, barrel-like tubular body, the mesh material providing openings adapted to permit the passage of a bird therethrough, said mesh material including a plurality of substantially horizontally disposed perch elements partially defining said openings, and beads on said perch elements, said tubular body being open at its lower end, and means connected to the body for hanging said body from a support.

2. An amusement and exercising device for birds comprising a mesh material formed into an elongate, vertical barrel-like tubular body, said tubular body being open at its upper and lower ends, the mesh material at said ends being inclined to provide reduced entrances to the interior of said tubular body, the mesh material providing openings adapted to permit the passage of a bird therethrough, and means connected to the mesh material for hanging said body from a support.

3. An amusement and exercising device for birds comprising a mesh material formed into an elongate vertical, barrel-like tubular body, said tubular body being open at the upper and lower ends, the mesh material at said ends being inclined to provide reduced entrances to the interior of said tubular body, the mesh material providing openings adapted to permit the passage of a bird therethrough, said mesh material including a plurality of substantially horizontally disposed perch elements partially defining said openings, a perch carried by said mesh material and located directly below the open lower end of said tubular body, and means connected to said mesh material for hanging said tubular body from a support.

4. An amusement and exercising device for birds comprising a mesh material consisting of a plurality of rings arranged to form a tubular barrel-like body, each ring being arranged in contiguous overlapping relation with rings located horizontally adjacent thereto to provide openings adapted to permit the passage of a bird therethrough.

5. An amusement and exercising device for birds comprising a mesh material consisting of a plurality of rings arranged so that each ring overlaps in contiguous relation rings located horizontally adjacent thereto so as to provide openings of a size to permit the passage of a bird therethrough, the mesh material being formed into a tubular barrel-like body, said tubular body being open at least at one end, and means connected to the mesh material for hanging said tubular body from a support.

6. An amusement and exercising device for birds comprising a mesh material consisting of a plurality of rings arranged so that each ring overlaps in contiguous relation rings located horizontally adjacent thereto, a perch element extending horizontally and diametrically around the overlapping rings, said rings and perch elements defining openings of a size to permit the passage of a bird therethrough, the rings providing rounded, curvilinear ring portions that constitute lateral margins of said openings which conform substantially to the contour of the bird's body to provide a stroking action, the mesh material being formed into a barrel-like tubular body that is open at one end, and means connected to said mesh material for hanging said tubular body from a support.

7. An amusement and exercising device for birds comprising a mesh material consisting of a plurality of rings arranged so that each ring overlaps in contiguous relation rings located horizontally adjacent thereto to provide openings of a size to permit the passage of a bird therethrough, the mesh material being formed into a barrel-like tubular body that is open at its lower end, a perch carried by said mesh material and located directly below the open lower end of said tubular body, and means connected to the mesh material for hanging said tubular body from a support.

8. An amusement and exercising device for birds comprising a mesh material consisting of a plurality of rings arranged so that each ring overlaps in contiguous relation rings located horizontally adjacent thereto, a perch element extending horizontally and diametrically around the overlapping rings, said perch elements and rings defining openings adapted to permit the passage of a bird therethrough, said mesh material being formed into a vertical barrel-like tubular body that is open at the upper and lower ends, said rings being included inwardly at said upper and lower ends to provide reduced entrances to the interior of said tubular body, and means connected to said mesh material for hanging said tubular body from a support.

9. An amusement and exercising device for birds comprising a mesh material consisting of a plurality of rings arranged so that each ring overlaps in contiguous relation rings located horizontally adjacent thereto, a perch element extending horizontally and diametrically around the overlapping rings, said perch elements and rings defining openings of a size to permit the passage of a bird therethrough, the mesh material being formed into a vertical barrel-like tubular body that is open at the upper and lower ends, a perch carried by said mesh material and located directly below the open lower end of said tubular body, and means connected to said mesh material for hanging the upper end of said body from a support, the rings at the upper and lower ends of said tubular body being inclined inwardly to provide reduced entrances to the interior of said tubular body.

References Cited in the file of this patent

UNITED STATES PATENTS 2,648,539     Packer _____ Aug. 11, 1953

FOREIGN PATENTS 925,096     Germany _____ Mar. 10, 1955